US008236080B2

(12) United States Patent
Desjardins

(10) Patent No.: US 8,236,080 B2
(45) Date of Patent: Aug. 7, 2012

(54) RATCHET CLIP

(75) Inventor: Mike Desjardins, Portage, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 712 days.

(21) Appl. No.: 12/335,111

(22) Filed: Dec. 15, 2008

(65) Prior Publication Data

US 2010/0146748 A1 Jun. 17, 2010

(51) Int. Cl.
| B01D 46/00 | (2006.01) |
| A41F 1/00 | (2006.01) |
| A41F 3/04 | (2006.01) |
| A41F 1/08 | (2006.01) |
| A43C 11/00 | (2006.01) |
| A44B 1/04 | (2006.01) |
| A44B 11/25 | (2006.01) |
| A44B 17/00 | (2006.01) |
| A44B 19/00 | (2006.01) |
| E05C 3/16 | (2006.01) |

(52) U.S. Cl. ........ 55/493; 24/591.1; 24/593.11; 24/505; 24/506; 292/216; 55/503

(58) Field of Classification Search ........... 24/71, 591.1, 24/593.11, 505–506; 292/216; 220/200; 55/493
See application file for complete search history.

(56) References Cited

U.S. PATENT DOCUMENTS

| 4,183,120 | A | * | 1/1980 | Thorne | 24/16 R |
| 4,213,643 | A | | 7/1980 | Blind et al. | |
| 4,483,556 | A | * | 11/1984 | LiVolsi | 285/252 |
| 4,842,739 | A | * | 6/1989 | Tang | 210/489 |
| 5,192,346 | A | * | 3/1993 | Kowalczyk | 96/135 |
| 5,584,452 | A | * | 12/1996 | Koike | 248/74.3 |
| RE35,418 | E | * | 1/1997 | Martignago | 24/68 SK |
| 5,775,653 | A | * | 7/1998 | Horney et al. | 248/230.8 |
| 5,887,948 | A | * | 3/1999 | Hannes | 297/411.35 |
| 5,909,850 | A | * | 6/1999 | Cavasin et al. | 24/71 SK |
| 6,059,245 | A | * | 5/2000 | Hermansen et al. | 248/311.2 |
| 6,164,605 | A | * | 12/2000 | Drake et al. | 248/74.3 |
| 6,266,852 | B1 | * | 7/2001 | Tai | 24/16 PB |
| D448,657 | S | * | 10/2001 | Calvert | D8/396 |
| 6,306,192 | B1 | | 10/2001 | Volker et al. | |
| 6,554,297 | B2 | * | 4/2003 | Phillips et al. | 280/14.22 |
| 6,684,465 | B1 | | 2/2004 | Alejandro | |
| 6,694,644 | B2 | * | 2/2004 | Haupt | 36/50.5 |

(Continued)

*Primary Examiner* — Duane Smith
*Assistant Examiner* — Amber Orlando
(74) *Attorney, Agent, or Firm* — James Hasselbeck

(57) ABSTRACT

A ratchet clip for lockably and releasably closing a cover onto a base of a air filter housing is disclosed. The ratchet clip includes an elongated retention member secured at one portion of the housing and having a plurality of teeth forming a series of pockets and ridges. A rocker member is pivotally secured to a different housing portion and is aligned to lockably engage the retention member. A latching member on the rocker member is sized, configured and positioned to lockably engage into the pockets thereby inhibiting movement of the latching member in an opening direction relative to the retention member. A spring biases the rocker member to lockably and releasably engage the retention member thereby preventing movement in an opening direction of the rocker member relative to the retention member. The teeth have surfaces configured to permit the latching member to slide over the teeth in a closing direction relative to the retention member, even while the spring biases. The rocker body is operable to overcome biasing of the spring, permitting the rocker member to disengage the latching member thereby allowing the latching member to slide freely relative to the retention member.

11 Claims, 5 Drawing Sheets

U.S. PATENT DOCUMENTS

| | | |
|---|---|---|
| 7,178,203 B2 | 2/2007 | Pearson et al. |
| 7,311,748 B2 | 12/2007 | Holmes et al. |
| 7,661,634 B2 * | 2/2010 | Thompson ............ 248/74.3 |
| 7,900,324 B2 * | 3/2011 | Ginocchio ............ 24/272 |
| 2002/0083558 A1 * | 7/2002 | Tsou ............ 24/3.12 |

* cited by examiner

RATCHET CLIP

TECHNICAL FIELD

The present invention generally relates to ratchet clips and, more particularly, to ratchet clips for releasably securing two portions of an air filter housing in a closed position.

BACKGROUND OF THE INVENTION

Air filter housings for motor vehicles may consist of a base portion and a cover portion, configured to receive an air filter therein. The cover is secured onto the base portion by any number of conventional means, including screws, studs or spring retention clips. Retentions clips made of elastic materials such as spring steel are known and widely used in securing covers to air filter housings and other such housings in motor vehicle applications. Such retention clips are typically pivotally secured onto an air cleaner housing in some fashion and are configured to engage and clamp an air cleaner housing cover to the air cleaner housing body.

Air cleaner housings are typically configured in two separable halves, each which are provided with mating flanges. The air filter element is typically installed into a cavity in the air cleaner housing by separating the housing halves, inserting the filter element, and then securing the housing halves together.

U.S. Pat. No. 4,213,643 discloses a metal retention clip of the knee lever type, usable to clamp a filter cover onto a filter housing.

U.S. Pat. No. 6,306,192 discloses a filter housing separable into two housing portions and provided with locking clamps having tension levers operable to retentively clamp the two housing portions together. A filter is installed into a cavity therein.

U.S. Pat. No. 7,311,748 discloses an air filter assembly including abutting cylindrical housing halves. The housing halves are joined by T-shaped appendages and a locking mechanism. A filter is installed into a cavity therein.

Filter elements installed into such filter housings are typically provided with a resilient seal member to seal between the filter element and the filter housing. The seal prevents unfiltered air from bypassing the filter element and entering the clean side of the filter housing.

A problem with the use of screws or studs as a retention means to secure a cover onto an air filter housing is that screws and studs require the use of a tool to tighten or loosen the retention means. Metal retention clips do not require the use of a tool but can at times be difficult to remove and re-fasten.

As can be seen, there is a need for a clip or retention means for securing mating portions of a housing together, a clip or retention means that does not require the use of tools, is quickly engaged and released and is low in cost.

SUMMARY OF THE INVENTION

Disclosed is a ratchet clip and an improved filter housing using the ratchet clip or clips for releasably securing two portions of an air filter housing into a closed position.

In one aspect of the invention, a ratchet clip for lockably and releasably closing a first member onto a second member includes an elongated retention member secured to the second member and having a plurality of teeth forming a series of pockets and ridges. An elongated rocker member is pivotally secured to the first member and aligned to engage the retention member. The rocker member is pivotally operable between an engaged and a released position. The rocker member includes a latching member sized, configured and positioned to lockably engage into the pockets thereby inhibiting movement of the latching member in an opening direction relative to the retention member. A spring biases the rocker member to lockably releasably engage the retention member thereby preventing movement in an opening direction of the rocker member relative to the retention member. The teeth each have surfaces configured to permit the latching member to slide over the teeth in a closing direction relative to the retention member even while the spring biases. The rocker body is operable to overcome biasing of the spring, permitting the rocker member to disengage the latching member thereby allowing the latching member to slide freely relative to the retention member.

In another aspect of the invention, each tooth of the retention member includes an engagement ledge configured to lockably engage the latching member. A ramp face is provided on a tooth side opposing the engagement ledge with the engagement ledge and ramp face meeting to form a ridge of the tooth.

In another aspect of the invention, the rocker member further includes a pivot pin pivotally mounting the rocker member to the first member. A rocker body is secured at a mid portion to the pivot pin. A release member provided at a second end of the rocker body. The release member is operable to pivot the rocker member to disengage the latching member from the retention member.

In another aspect of the invention, the spring is a leaf spring having a first end biasing against the first member and a second end biasing against the rocket arm.

In another aspect of the invention, the spring is a coil spring encircling a portion of the pivot pin. The spring has a first end configured to bias against a pad portion of the rocker body and a second end configured to bias against the first member.

In another aspect of the invention, the engagement ledge is substantially perpendicular to an axis of elongation of the retention member and the teeth share uniformity of size and spacing relative to each other.

In another aspect of the invention, the retention member is received in a gap between the rocker member and the second member.

In another aspect of the invention the ratchet clip includes a pair of ribs each having a pivot hole and secured to the first member in spaced parallel relationship. The ribs are spaced apart to receive the rocker member therebetween. The pivot pin is configured to be rotatably and supportively received at opposing ends into the pivot holes to provide the pivotal securing of the rocker member.

In another aspect of the invention, the ratchet clip is formed from molded plastic.

In another aspect of the invention, an air filter housing having a ratchet clip is disclosed. The air filter housing has a base portion and a removable cover portion configured to receive a filter element. The filter element is sized and configured to be installed into the filter housing. A ratchet clip assembly is provided to releasably secure the cover onto the base portion. The ratchet clip assembly includes an elongated retention member secured to one of the housing portions and having a plurality of teeth forming a series of pockets and ridges. An elongated rocker member is pivotally secured to a different one of the housing portions and aligned to engage the retention member. The rocker member is operable between an engaged and a released position. The rocker member includes a latching member sized, configured and positioned to lockably engage into the pockets, thereby inhibiting movement of the latching member in an opening direction relative to the retention member. A spring biases the rocker member to lockably releasably engage the retention member, thereby preventing movement in an opening direction of the rocker member relative to the retention member. The teeth are configured to permit the latching member to slide over the teeth in a closing direction relative to the retention member while the spring biases, permitting the cover portion to lockably and releasably close upon the base portion. The rocker member is operable to overcome biasing of the spring, thereby permitting the rocker member to disengage the latching member and allowing the latching member to slide freely relative to the retention member permitting the cover portion to open relative to the base portion.

In another aspect of the invention, the ratchet clip is molded from plastic in the same mold at the same time and in an assembled position on one of the housing portions using gated molding techniques. The retention clip is connected to the first one of the filter housing portions by at least one gate that later is broken after removal from the mold to allow the retention clip to pivot.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

An improved retention means for releasably closing and securing a first member onto a second member is disclosed. The improved retention means is provided by the quick release ratchet clip of the present invention.

Figure 1:
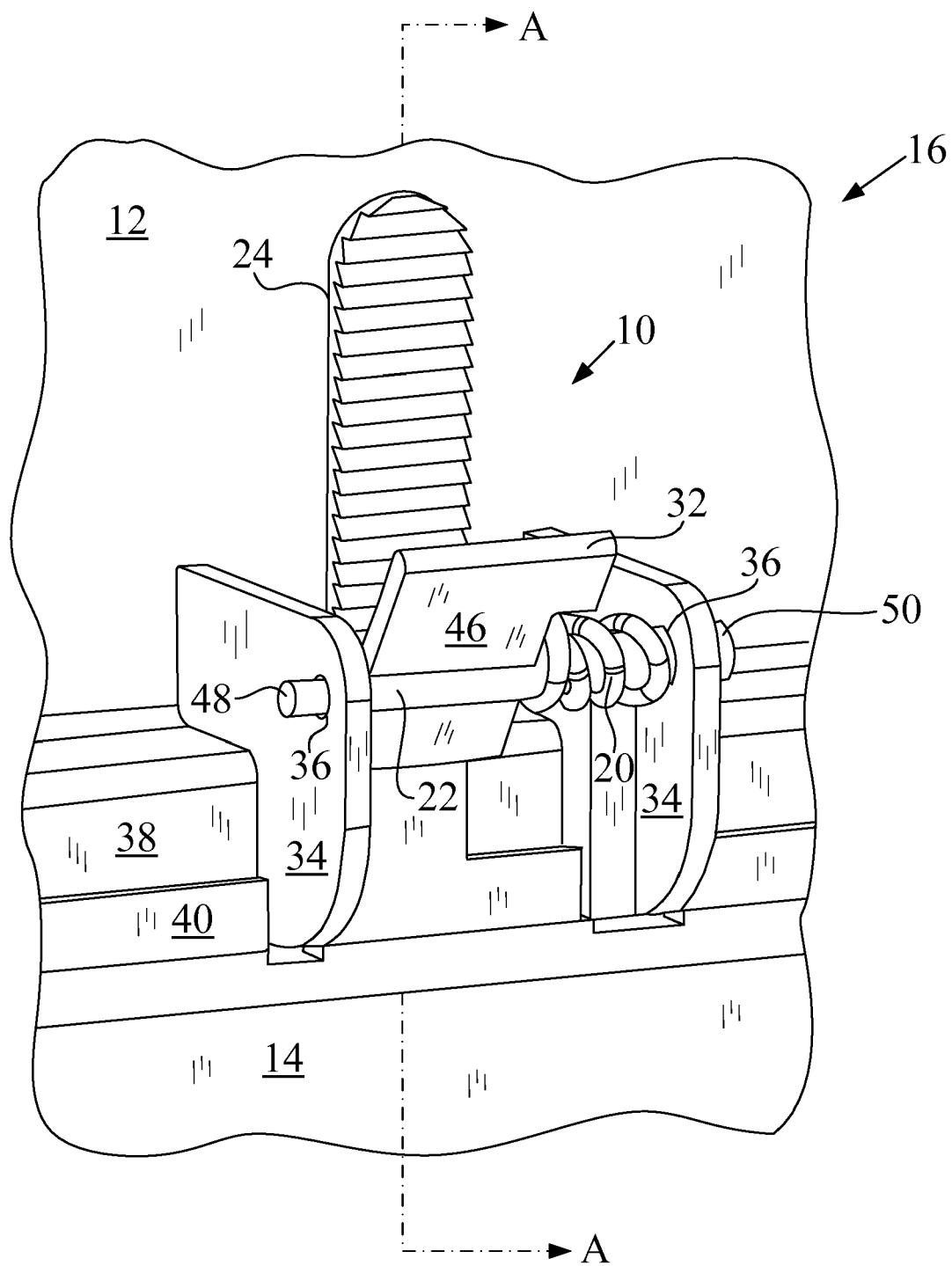
FIG. 1 depicts a perspective view of a quick release ratchet clip integrated with a housing to releasably secure together two portions of a housing, consistent with the present invention.
Figure 2:
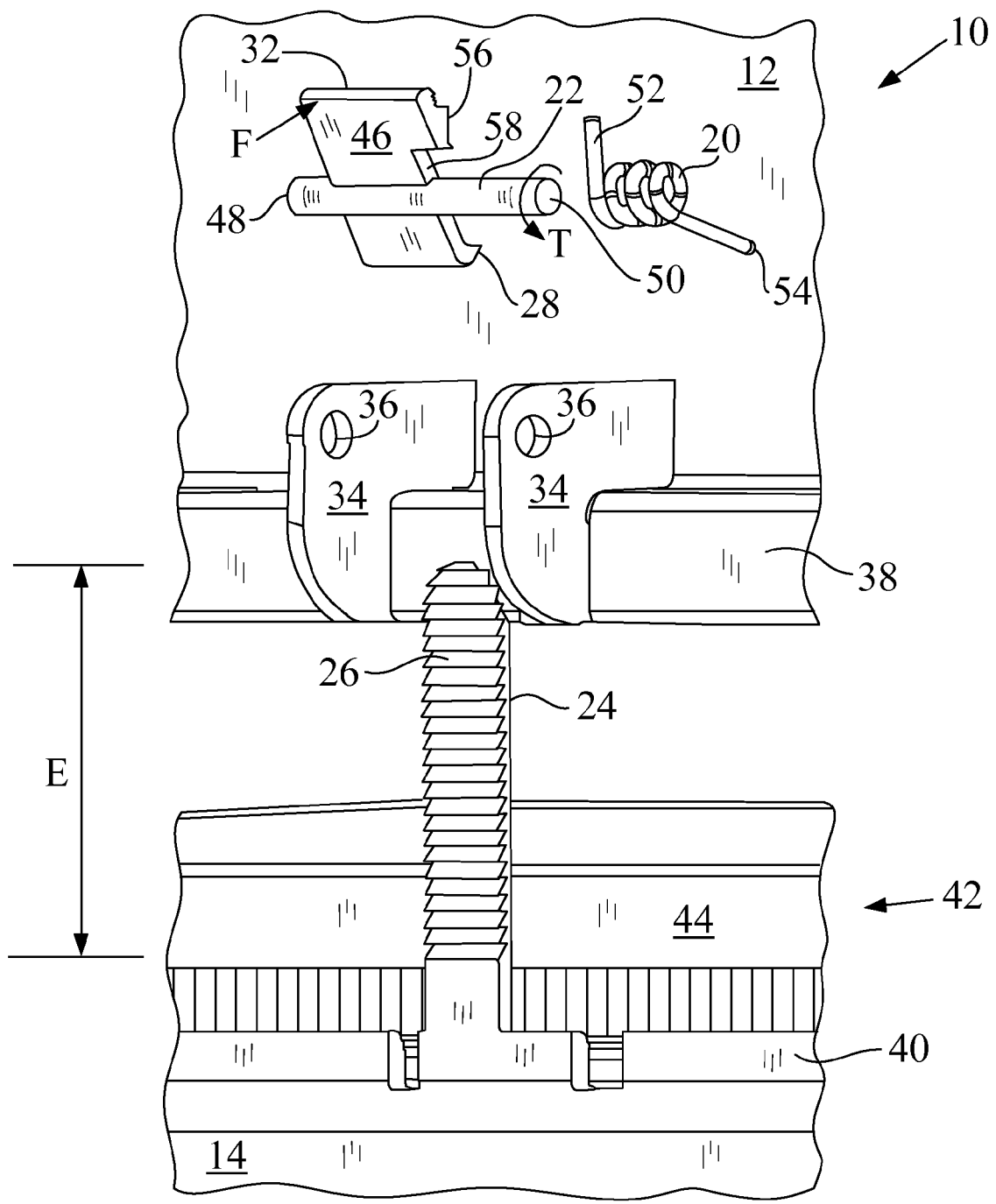
FIG. 2 depicts an exploded assembly view of the quick release ratchet clip of FIG. 1, consistent with the present invention.

FIG. 1 depicts a perspective view of a quick release ratchet clip assembly 10 integrated onto a two piece housing 16, for example an automotive air cleaner housing. FIG. 2 depicts an exploded assembly view of the quick release ratchet clip of FIG. 1. The quick release ratchet clip assembly 10 is operable to releasably secure the cover 12 portion of the housing 16 onto the base 14 portion of the housing 10. The cover 12 and base 14 are aligned to closeably mate along complementary mating flange 38 (provided on the cover 12) and mating flange 40 (provided on the base 14). A filter element 42 circumscribed by a resilient seal element 44 is sized and configured to be received between the mating flanges 38 and 40 into the housing, thereby sealing a chamber (not shown) in the cover 12 from another chamber (not shown) provided in the lower housing. The seal element 44 thereby requires air flowing between the chambers to pass through the filter element 42.

As can be seen particularly on FIG. 2, the ratchet clip assembly 10 includes an elongated retention member 24 integrated with or secured onto an outside surface of the housing base 14 and extending generally upwards towards the cover 12. The elongated retention member 24 is provided with a plurality of teeth 26 formed along an engagement portion E of its length. An elongated rocker member 46 is rotatably secured onto the cover 12 of the housing 16 and positioned to align with the elongated retention member 24.

A pair of support ribs 34 arranged in a spaced parallel relationship is secured to the cover 12 and extends outwards from the cover 12 and downwards over a portion of the flange 38 of cover 12. The support ribs 34 are spaced apart sufficiently to permit the engagement portion E of the elongated retention member 24 to be received between the ribs 34.

The elongated rocker body 46 is provided with a pivot pin 22 extending crosswise across a mid portion of the rocker body 46. Support member or members such as support ribs 34 support and rotatably secure pivot pin 22 and thereby the rocker member 46 to the cover 12. The pivot pin has two opposing ends 48 and 50 and may be rotatably secured at either end by a support member, or secured at both ends by support members such as ribs 34 as illustrated in FIG. 2. The rocker body is rotatably operable about an axis defined by the pivot pin between an engaged position and a released position.

Support ribs 34 are each provided with a pivot hole 36 sized and aligned to permit opposing ends of pivot pin 22 to be rotatably and supportively received therein.

The rocker body 46 has a latching member 28 provided at a first end of the rocker body 46 and a release member 32 provided at an opposing second end of the rocker body 46. The latching member 28 is sized and configured to be releasably engageable between the teeth 26 of the elongated retention member 24 when the rocker body 46 is in the engaged position (position illustrated in FIG. 1). The release member 32 is operable by application of sufficient force F applied to the release member 32 and directed towards the cover 12 so as to rotate the rocker body 46 about the pivot pin 22 axis to a released position.

A spring 20 is provided to bias the rocker body 46 such that the latching member 28 is urged to engaged with teeth 26 of the elongated retention member 24, thereby preventing the cover 12 and base 14 from increasing a separation distance therebetween. It is envisioned that spring 20 may be realized in any number of ways. In one example the spring 20 may be realized as a leaf spring having a first end biasing against the cover 12 and a second end biasing against a portion of the rocker body 46. In the exemplary embodiment of FIG. 2, the spring 20 is a coil spring encircling a portion of the pivot pin 22 and having a first end 52 configured to bias against a pad portion 56 of the rocker body 46. A second end 54 of the spring 20 is configured to bias against the cover 12 (example—flange 38 or the side of cover 12), such that the spring 20 applies a torque T about the pivot pin 22 operative to urge the latching member 28 to engage with the teeth 26 of the retention member 24.

Advantageously, the support ribs 34 extend downwards over the flange 38 of the cover 12 and are spaced to guide the retention member 24 to be received between the ribs 34 and then be held in alignment between the ribs 34, thereby maintaining the retention member 24 in proper alignment so as to be successfully retentively engaged by the latching member 28 of rocker body 46.

In some embodiments the support ribs 34 are preferably a pliable material such as a suitable plastic composition so that the ribs 34 may be urged to elastically bend apart somewhat to permit the rocker body pivot pin 22 to be installed into the pivot holes 36, such as after installation of the spring 20 onto the pivot pin 22.

Preferably the rocker body 46 includes a recess or notch 58 to provide space for the coiled spring 20 to be received on the pivot pin 22 and between the ribs 34. Preferably the recess or notch 58 is of sufficient size to receive the spring while not extending into the release member 32 such that the width of the release member 32 is not compromised, thereby providing a maximal width release member that is more easily operable by a human hand.

Figure 3A:
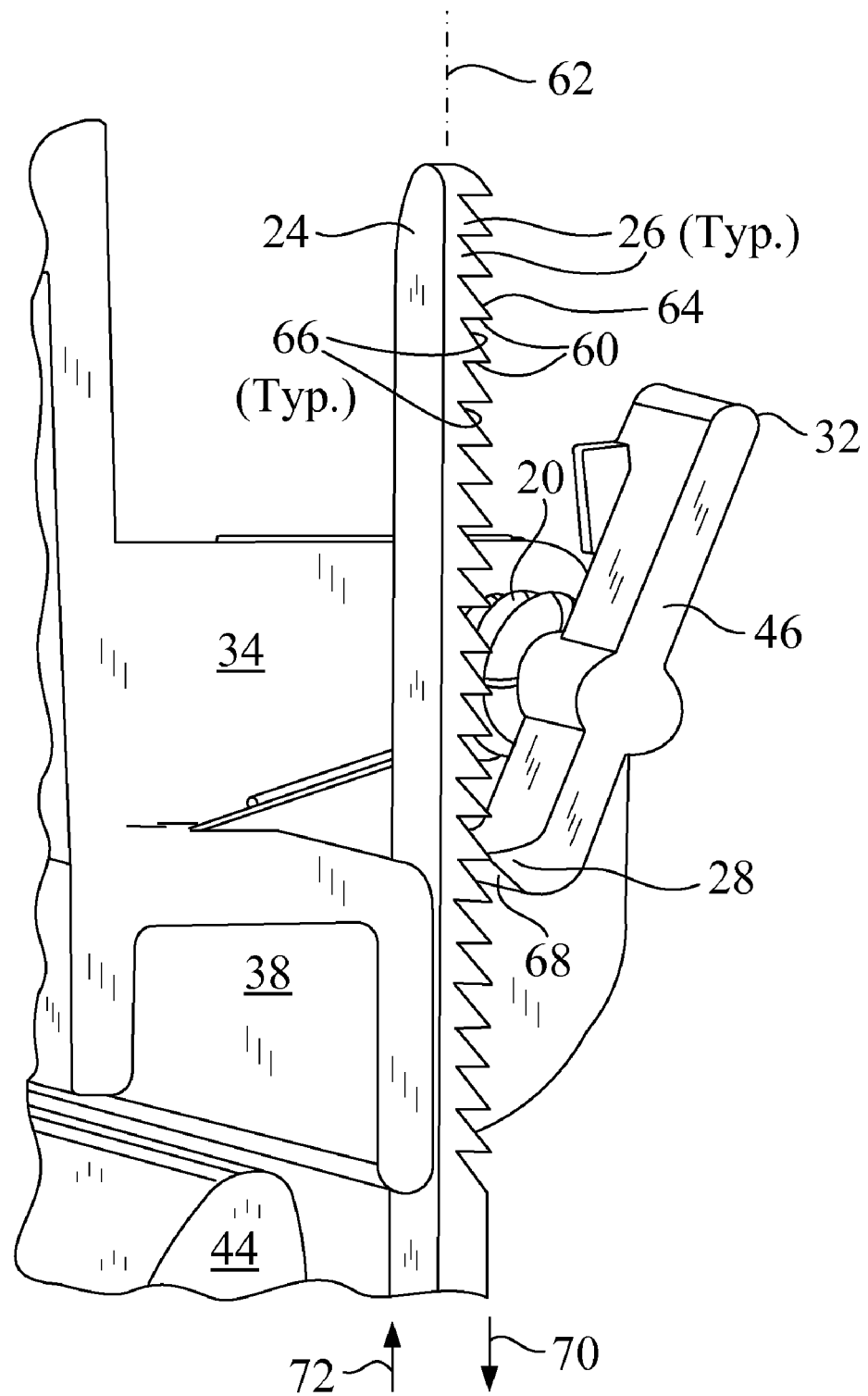
FIG. 3A depicts a sectional view, taken along section line A-A of FIG. 1, illustrating the operative features of the present invention.
Figure 3B:
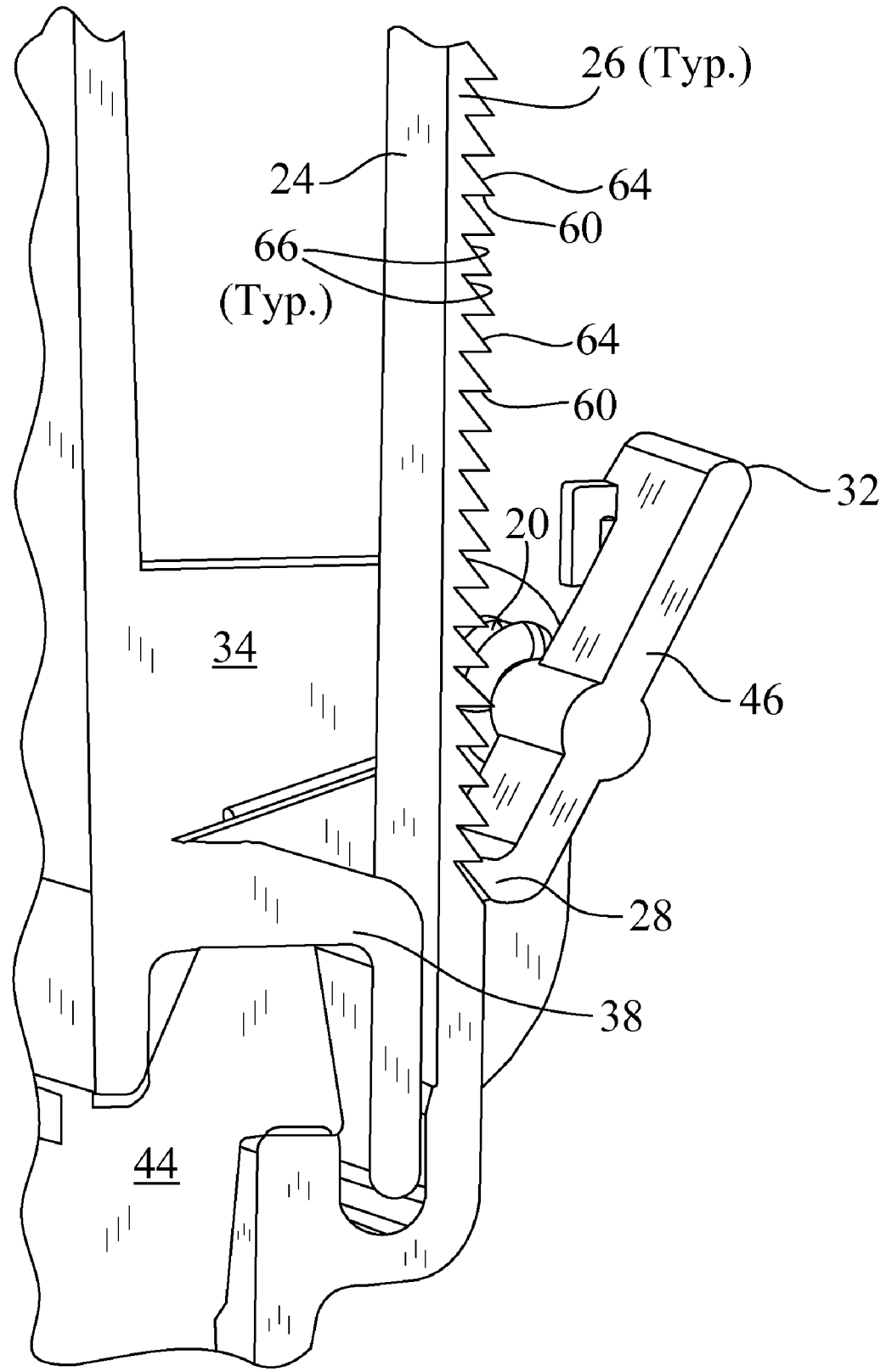
FIG. 3B depicts a sectional view, taken along section line A-A of FIG. 1, illustrating the ratchet clip releasably securing the housing portions in a closed position.

The discussion is now directed to FIGS. 3A and 3B. FIG. 3A depicts a sectional view, generally taken along section line A-A of FIG. 1 but with the housing 16 in a partially open position, illustrating the operative features of the present invention. FIG. 3B depicts a sectional view, generally taken along section line A-A of FIG. 1, illustrating the ratchet clip releasably securing the housing portions in a closed position.

As can been seen, the teeth 26 of the retention member each have an engagement ledge 60 configured substantially perpendicular to an axis of elongation 62 of retention member 24. Ramp faces 64 are provided on a side of each tooth generally opposite the engagement ledge 60. A pocket 66 is thereby defined by the engagement ledge 60 of a tooth and the ramp face 64 of an adjacent tooth. The latching member 28 of the rocket body 46 is sized and configured to be engagebly received into any of the defined pockets 66. The approach face 68 of the latching member 28 is angled to substantially match the angle of the ramp faces 64 of teeth 26, permitting the latching member 28 to slide over the teeth 26 when the cover and latching member 28 are moving in a closing direction 70 relative to the base 14 and retention member 24. When moving in a closing direction 70, the latching member 28 slides upwards on the ramp face 64, thereby urging the rocker body 46 to rotate about an axis defined by then pivot pin 22, without any need for an operator to apply a releasing force to the release member 32. Upon reaching the top of the tooth, the latching member transitions over the top of the tooth and drops down the engagement ledge 60 into the next pocket 66. In this way, the ratchet clip assembly permits the housing to freely close without requiring external actuation of the release member 32 and while the spring 20 continues to bias the rocker body 46.

Therefore, advantageously, the ratchet clip assembly 10 permits the cover 12 to freely close (moving in close direction 70) upon the base 14 (see FIG. 1) without manually actuating the release member 32 with a force such as force F (FIG. 2).

While the ratchet clip assembly 10 permits the cover 12 to freely close upon the base 14, this is not the case when the cover is urged to move in an opening direction 72 relative to the base 14. In this case the latching member 28 retentively engages against the engagement ledge 60 of the teeth 26 of the elongated retention member 24. As the engagement ledge 60 is inclined substantially perpendicular to the axis of elongation 62 of the elongated retention member 24 which is also parallel to the direction of travel of the retention member 24 relative to the latching member 28, the latching member 28 retentively engages against the engagement ledge 60 thereby preventing the cover 12 from moving in an opening direction 72 relative to the base 14.

Advantageously, the interaction of the latching member 28 with the teeth 26 of the retention member 24 prevents the cover 12 from moving away or separating from the base 14 without an intentional actuation of the release member 32.

Figure 4:
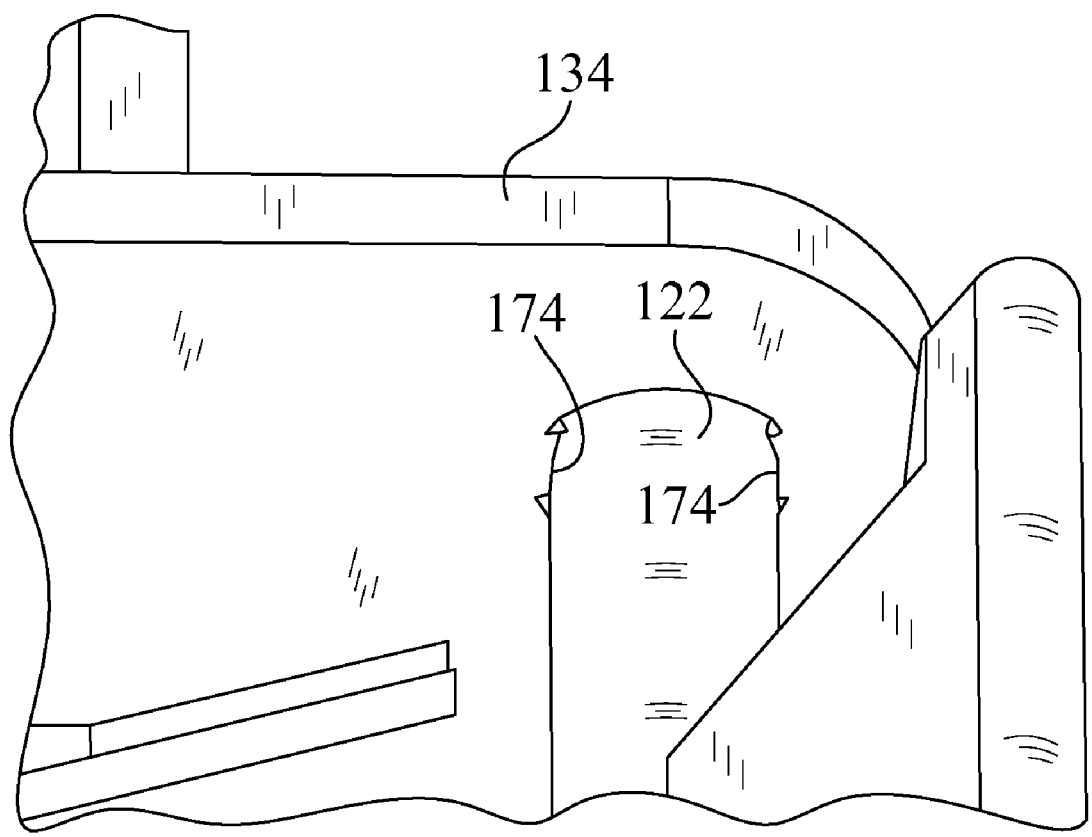
FIG. 4 depict a side view of a rib and pivot pin of a ratchet clip of another embodiment of the ratchet clip assembly of the prevent invention, illustrating gate portions permitting the ratchet clip to be molded in the same mold and at the same time as the support ribs and housing cover, consistent with the present invention.

FIG. 4 depicts a side view of another embodiment of a support rib 134 secured to a housing portion together with a pivot pin 122 of a ratchet clip assembly. In this embodiment, the pivot pin 122 is molded together, at the same time, with the support ribs and housing portion by using a mold design that permits mold material flow from the support rib 134 to the pivot pin 122 through one or more gates 174. The molded material flow through the gates 174 forms a unitary module in which the pivot pin 122 is connected to the support rib 134 through molded material left in the gates 174. After completion of the molding process, the gates 174 can be broken to permit the pivot pin 122 to rotate in the pivot hole 136.

Advantageously, as the pivot pin can be molded at the same time in the same mold as the housing portions using gates, the ratchet clip can be molded at the same time and in the same mold as the housing, eliminating separate components as well as additional steps required to assemble the ratchet clip onto the housing.

While the best modes for carrying out the invention have been described in detail, those familiar with the art to which this invention relates will recognize various alternative designs and embodiments for practicing the invention within the scope of the appended claims.

The invention claimed is:

1. A ratchet clip for lockably and releasably closing a first housing member onto a second housing member, comprising:
   an elongated retention member secured to said second housing member and having a plurality of teeth forming a series of pockets and ridges;
   an elongated rocker member having a pivot pin formed integrally as a unitary one piece component with said rocker member, said pivot pin portion of said rocker member pivotally secured to said first housing member, aligned to engage said retention member and operable between an engaged and a released position, said rocker member having:
      a latching member sized, configured and positioned to lockably engage into said pockets inhibiting movement of said latching member in an opening direction relative to said retention member; and
      a spring biasing said rocker member to lockably releasably engage said retention member preventing movement in an opening direction of said rocker member relative to said retention member;
      wherein said teeth are configured to permit said latching member to slide over said teeth in a closing direction relative to said retention member while said spring biases; and
      wherein said rocker member is operable to overcome biasing of said spring, permitting said rocker member to disengage said latching member, allowing said latching member to slide freely relative to said retention member;
   a pair of support ribs secured to said first housing member in spaced parallel relationship, each support rib having a pivot hole, said ribs spaced apart to receive said rocker member therebetween, said pivot pin having opposing ends received into said pivot holes and connected to said support ribs through gates;
   wherein said pivot pin is formed integrally as a one-piece component with said rocker member and with said first housing member and said support ribs;

wherein said gates can be later broken to permit said pivot pin to rotate in said pivot holes.

2. The ratchet clip of claim 1, wherein each tooth of said retention member comprises:
an engagement ledge, said lockably and releasably engagement provided by said latching member engaging against engagement ledges; and
a ramp face on a tooth side opposing said engagement ledge, said engagement ledge and ramp face meeting at said ridge of said tooth.

3. The ratchet clip of claim 2, wherein
said rocker member is secured at a mid portion to said pivot pin with-said latching member provided at a first end of said rocker member; and
a release member is provided at a second end of said rocker member, said release member operable to pivot said rocker member to disengage said latching member from said retention member.

4. The ratchet clip of claim 3, wherein said spring is a leaf spring having a first end biasing against said first housing member and a second end biasing against said rocket arm.

5. The ratchet clip of claim 3, wherein said spring is a coil spring encircling a portion of said pivot pin, said spring having a first end configured to bias against a pad portion of said rocker member and a second end configured to bias against said first housing member.

6. The ratchet clip of claim 5, wherein said engagement ledge is substantially perpendicular to an axis of elongation of said retention member and wherein said teeth share uniformity of size and spacing.

7. The ratchet clip of claim 6, wherein said retention member is received in a gap between said rocker member and said second housing member.

8. The ratchet clip of claim 7, wherein
said retention member is received between said ribs.

9. The ratchet clip of claim 8, wherein said ratchet clip comprises molded plastic.

10. An air filter housing comprising:
a filter housing having a base portion and a removable cover portion,
wherein a first one of said housing portions includes a pair of mounting ribs formed integral with a first one of said housing portions as a unitary one-piece component, said ribs having a pivot hole, said ribs positioned in a spaced parallel relationship on said first housing portion;
a filter element sized and configured to be installed into said filter housing;
a ratchet clip assembly, comprising:
an elongated retention member secured to a second one of said housing portions and having a plurality of teeth forming a series of pockets and ridges,
wherein said elongated retention member is positioned between said ribs;
an elongated rocker member pivotally secured to said first one of said housing portions, aligned to engage said retention member and operable between an engaged and a released position, said rocker member having:
a latching member sized, configured and positioned to lockably engage into said pockets inhibiting movement of said latching member in an opening direction relative to said retention member; and
a spring biasing said rocker member to lockably releasably engage said retention member preventing movement in an opening direction of said rocker member relative to said retention member;

wherein said teeth are configured to permit said latching member to slide over said teeth in a closing direction relative to said retention member while said spring biases, permitting said cover portion to lockably and releasably close upon said base portion; and
wherein said rocker member is operable to overcome biasing of said spring, permitting said rocker member to disengage said latching member, allowing said latching member to slide freely relative to said retention member permitting said cover portion to open relative to said base portion,
wherein said teeth have:
an engagement ledge on one side; and
a ramp face on an opposing side;
wherein said elongated rocker member having a pivot pin formed integrally as a unitary one piece component with said rocker member,
said pivot pin having opposing ends received into said holes of said first housing portion mounting ribs and connected to said mounting ribs through gates;
wherein said pivot pin is formed at a mid portion of said rocker member;
a release member provided at a second end of said rocker body opposing said latching member, said release member operable to pivot said rocker member to disengage said latching member;
wherein said pivot in is formed integrally as a one-piece component with said rocker member and with said first one of said housing portions and said mounting ribs;
wherein said gates can be later broken to permit said pivot pin to rotate in said holes.

11. An air filter assembly comprising:
a filter housing having a base portion and a removable cover portion;
a filter element sized and configured to be installed into said filter housing;
a ratchet clip assembly, comprising:
an elongated retention member secured to one of said housing portions and having a plurality of teeth forming a series of pockets and ridges;
an elongated rocker member pivotally secured to a different one of said housing portions, aligned to engage said retention member and operable between an engaged and a released position, said rocker member having:
a latching member sized, configured and positioned to lockably engage into said pockets inhibiting movement of said latching member in an opening direction relative to said retention member; and
a spring biasing said rocker member to lockably releasably engage said retention member preventing movement in an opening direction of said rocker member relative to said retention member;
wherein said teeth are configured to permit said latching member to slide over said teeth in a closing direction relative to said retention member while said spring biases, permitting said cover portion to lockably and releasably close upon said base portion; and
wherein said rocker member is operable to overcome biasing of said spring, permitting said rocker member to disengage said latching member, allowing said latching member to slide freely relative to said retention member permitting said cover portion to open relative to said base portion, wherein said ratchet clip assembly comprises
- a pair of mounting ribs having a pivot hole, said ribs secured one of said housing portions, said ribs positioned in a spaced parallel relationship;
- wherein said elongated retention member is positioned between said ribs;
- wherein said teeth have:
  - an engagement ledge on one side; and
  - a ramp face on an opposing side;
- wherein said elongated rocker member is received between said mounting ribs, said rocker member further having:
  - a pivot pin having opposing ends sized and configured to be rotatably and supportively received into said holes of said mounting ribs;
  - a rocker body secured at a mid portion onto said pivot pin;
  - a release member provided at a second end of said rocker body opposing said latching member, said release member operable to pivot said rocker member to disengage said latching member,
- wherein said ratchet clip is molded from plastic in the same mold at the same time in an assembled position with said first one of said filter housing portions,
- wherein said pivot in is formed integrally as a one-piece component including said rocker member, one of said housing portions and said mounting ribs,
- wherein said pivot pin is connected to said mounting ribs through molded plastic gates,
- wherein said gates can be later broken to permit said pivot pin to rotate in said holes.

* * * * *